Nov. 5, 1968  A. J. RICHARDS  3,409,317
BALL AND SOCKET JOINT
Filed Oct. 18, 1965
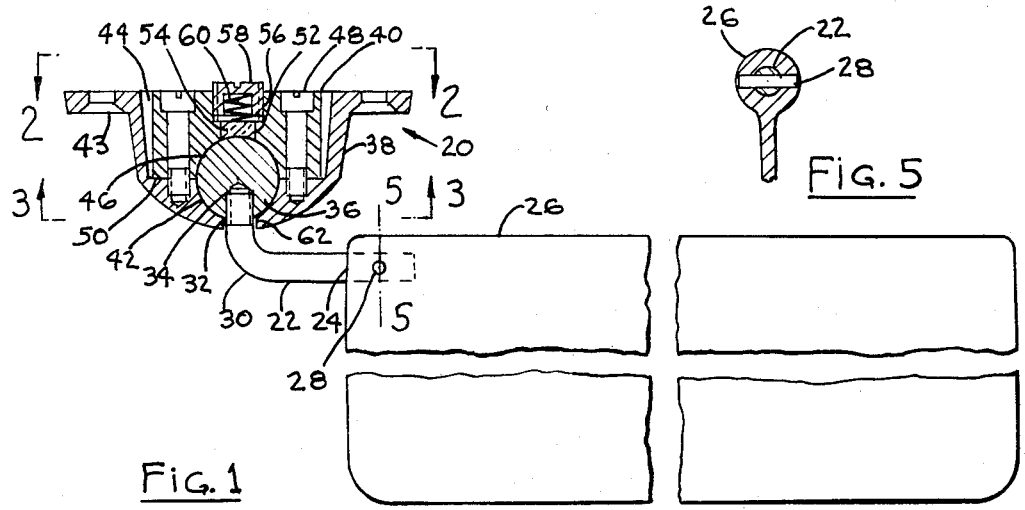
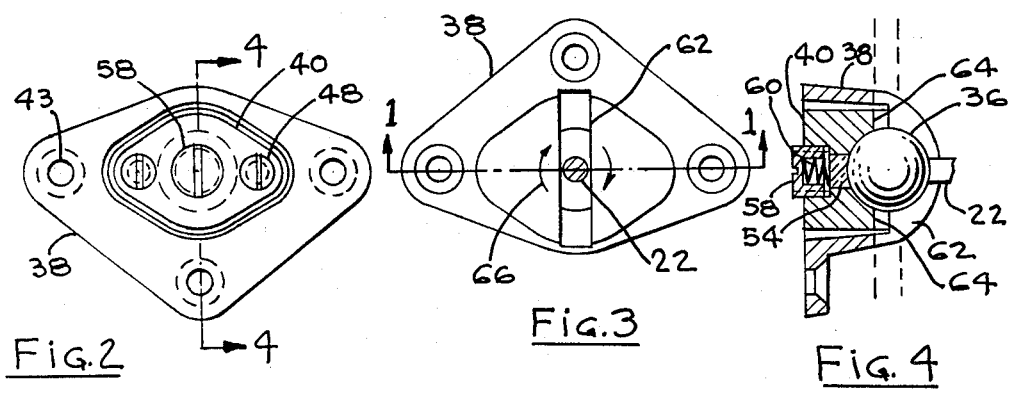
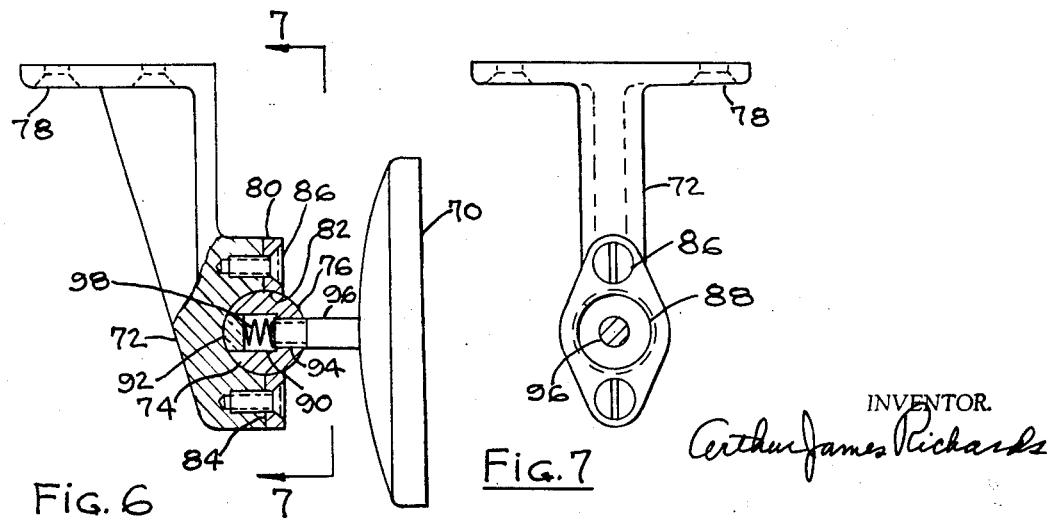
INVENTOR.
Arthur James Richards

United States Patent Office 3,409,317
Patented Nov. 5, 1968

3,409,317
BALL AND SOCKET JOINT
Arthur James Richards, 4240 Yorkshire Road,
Detroit, Mich. 48224
Filed Oct. 18, 1965, Ser. No. 497,131
1 Claim. (Cl. 287—21)

ABSTRACT OF THE DISCLOSURE

The invention disclosed relates to a ball and socket joint having a ball adapted for rotable movement in the socket of a socket member. A rod attached to the ball and projecting through an opening in the socket member carries a sun visor or a mirror of the type used with automotive vehicles. A friction element retained either by the ball or by the socket member is forced by a spring against the surface of the socket member or the surface of the ball to provide a frictional force to hold the ball against movement in the socket. The friction element and the surface the element bears against are fabricated from materials that have a high static coefficient of friction and a relatively low sliding coefficient of friction. The pressure of the spring on the friction element and the high static coefficient of friction between the material of the element and the material the element bears against provide the frictional force to hold the ball securely in a selected stationary position. The relatively low coefficient of friction between the material of the element and the material the element bears against allows the ball to be easily moved between various selected stationary positions.

---

An object of the present invention is to provide a ball and socket joint with an element having a static coefficient of friction on the surface the element bears against to hold the ball and the member attached to the ball in various positions and having a sliding coefficient of friction on the surface the element bears against to allow the ball to be readily moved to various positions.

Another object of the present invention is to provide a ball and socket joint with a friction element and a resilient member bearing against the friction element providing a static frictional force to hold the ball and a member attached to the ball in various positions and providing a relatively less sliding frictional force to allow the ball and the member attached to the ball to be readily moved to various positions.

Other objects and features of the invention will become apparent as the description proceeds especially when taken in conjunction with the accompanying drawings.

FIGURE 1 is a sectional view of the invention through line 1—1, FIG. 3 showing a sun visor attached to the ball of the joint.

FIGURE 2 is a view looking in the direction of the arrows 2—2, FIG. 1.

FIGURE 3 is a view looking in the direction of the arrows 3—3 of FIG. 1.

FIGURE 4 is a sectional view through line 4—4 of FIG. 2.

FIGURE 5 is a sectional view through line 5—5 of FIG. 1.

FIGURE 6 is a view of the invention partly in section showing a rear view mirror attached to the ball of the joint.

FIGURE 7 is a view looking in the direction of the arrows 7—7 of FIG. 6.

Referring to the drawings numeral 20 FIG. 1 generally indicates the ball and socket joint assembly. A rod 22 is tightly secured in an aperture as at 24 of the visor 26. A pin 28 passed through both the visor and rod 22 as shown in FIG. 5 secures the visor from rotating around the rod. The rod has a 90 degree bend as at 30 and terminates in a threaded portion 32. The threaded portion is screwed into the tapped aperture 34 of the ball 36 and tightly secured from turning with respect to the ball.

The socket for the ball is comprised of the members 38 and 40. The member 38 has a semispherical socket 42 that provides a bearing surface for the portion of the ball adjacent the tapped aperture 34. The member 40 sets into the recess 44 of the member 38 and has a semispherical socket 46 enclosing the ball. Member 40 is securely attached to member 38 by the screws 48. A plane passes through the mating surface 50 of the members 38 and 40 also passes through the center of the ball.

The countersunk apertures 43 accommodate mounting screws. The centerline of the aperture 52 in the member 40 passes through the center of the ball 36. The friction element 54 is free to move in the aperture 52 in a direction toward and away from the ball. The end of the friction element adjacent the ball is concave inwardly to coincide with the surface of the ball. The aperture 52 is enlarged and screw threaded as at 56 to receive the threaded retainer 58. A spring 60 bears against the friction element 54 to provide a force pressing the element against the ball. By screwing the retainer in or out of the threaded aperture the force against the friction element can be increased or decreased respectively.

The movement of the ball in the socket is limited by the freedom of movement of the rod attached to the ball. The rod passes through the slot 62 in the member 38. The slot also extends into the member 40 as at 64 FIG. 4 allowing the rod and visor attached to the rod to turn with the ball through an angle of 180 degrees as shown by the dotted lines of FIG. 4.

At any position of the rod 22 in the slot 62 the rod and the visor can be rotated with the ball in a clockwise or counterclockwise direction 360 degrees about an axis passing through the centerline of the portion of the rod screwed into the ball as shown by the arrows 66 of FIG. 3.

The members 38 and 40 can be fabricated from any suitable material such as metal castings or molded plastics. It is desirable that the ball be of a size to move freely in the socket when the members 38 and 40 are assembled together.

When used in a motor vehicle the visor assembly is mounted adjacent the upper edge of the windshield with the visor held in a stationary position out of the line of vision of the operator. The ball and socket joint allows the operator to move the visor to various positions adjusted to shield the operator from the sunlight.

The visor is held stationary in the various positions by a friction force that is the product of the force applied to bring the friction element 54 to bear against the surface of the ball times the coefficient of friction of the material of the element on the material of the surface of the ball. As shown in the drawings the pressure to bring the friction element to bear against the ball is applied by the spring 60. The pressure could also be applied through the retainer 58 by having the friction element bear directly against the retainer. The friction element could also be retained in an aperture in a manner to allow the screws 48 to apply pressure of the element against the ball when the member 40 is assembled in position.

Materials for the friction element 54 and the ball 36 are selected to provide a friction force to hold the ball and the visor attached to the ball stationary in the socket when out of the line of vision of the operator or in any of the adjusted positions and to also allow the ball and the visor attached to the ball to be easily moved between various stationary positions.

Materials that provide a friction force of a value that will allow the ball to be held against movement by the force of gravity acting on the visor, vibration and other extraneous forces and also allow the ball and the visor attached to the ball to be moved between adjusted positions with a relatively less force applied to the visor have a sliding coefficient of friction of a relatively less value than the value of the static coefficient of friction for the same materials. For example the value of the static coefficient of friction for cast iron on cast iron is approximately 1.10 and the value of the sliding coefficient of friction is approximately 0.15; for zinc on cast iron the value of the static coefficient of friction is approximately 0.85 and the value of the sliding coefficient of friction is approximately 0.21 and the value of the static coefficient of friction for copper on cast iron is approximately 1.05 and the value of the sliding coefficient of friction is approximately 0.29. These and other materials having similar coefficients of friction are suitable to use in fabricating the friction element and the ball.

FIG. 6 illustrates another form of the invention as used with a rear view mirror indicated at 70. The bracket member 72 has a semispherical surface 74 forming a socket to receive the ball 76. The counter sunk apertures 78 accommodate mounting screws. The assembly is preferably mounted in a motor vehicle to allow the driver to adjust the mirror to provide vision to the rear of the vehicle. Plate 80 retains the ball in the socket and has a partial spherical surface 82. A plane passing through the mating surface 84 of the member 72 and the plate 80 also passes through the center of the ball. Screws 86 hold the plate securely in place. The diameter 88 of the outer spherical surface 82 is smaller than the diameter of the ball at the surface intersected by the plane passing through the mating surface 82 allowing the plate to hold the ball in the socket. When the ball is secured in position it is free to move in the socket.

The centerline of the aperture 90 passes through the center of the ball 76. The friction element 92 is free to move in the aperture 90 in a direction toward and away from the surface 74. The end of the friction element 92 is concave outwardly to coincide with the surface 74. The aperture is reduced in diameter and tapped as a 94 to accommodate the threaded end of the rod 96. Spring 98 bears against the friction element 92 to provide a force pressing the friction element against the surface 74. By screwing the rod in or out of the threaded aperture the force against the friction element can be increased or decreased respectively. After the rod has been screwed to a position to provide the desirable force on the friction element the rod is secured from turning by peening or other suitable means. The rod 96 is an integral part of the mirror. The movement of the ball in the socket is limited by the diameter 88 of the spherical surface 82 that stops the rod 96 when the mirror is moved in a spherical arc to various adjusted positions.

The material forming the surface 74 and for the friction element 92 are selected to provide a friction force to hold the ball and the mirror attached to the ball stationary when the mirror is in a position adjusted to provide vision to the rear of the vehicle and to also allow the mirror to be easily moved between stationary positions. Materials having a sliding coefficient of friction of a relatively less value than the value of the static coefficient of friction as described for use with the friction element 54 and the ball 36 shown in FIG. 1 are also suitable to use for the surface 74 and the friction element 92.

The invention has been shown and described with reference to preferred applications and embodiments. The invention is suitable for other applications where a ball and socket joint is required. Modifications variations of the invention may be made to suit other applications without departing from the scope of the appended claims.

What I claim as my invention is:

1. A ball and socket joint comprising a ball member and a socket member seating said ball and each having a spherical bearing surface adapting said ball for rotary movement in the socket of said socket member, an opening in the socket member extending into the socket, a rod extending through said opening and attached to the ball, the opening being large enough to allow the rod and ball to be moved to various selected stationary positions in the socket, a friction element carried by one of said ball and socket members and movable relative thereto, resilient means forcing the friction element into frictional engagement with the bearing surface of the other of said members the material of one of the engaging surface of said friction element and the bearing surface of the said other member being cast iron and the material of the other surface being selected from the group of metals consisting of cast iron, zinc, and copper so as to provide a coefficient of friction between surfaces with the ball at rest that is more than approximately four times greater than the coefficient of friction between surfaces with the ball in movement to allow the ball to be firmly held in a selected stationary position and yet be easily moved between selected stationary positions.

References Cited

UNITED STATES PATENTS 1,648,441 11/1927 Brower.
2,593,253 4/1952 Booth.

CARL W. TOMLIN, *Primary Examiner.*

A. V. KUNDRAT, *Assistant Examiner.*